May 8, 1962 L. C. McNUTT 3,033,976
WELDING TORCH
Filed May 11, 1960 3 Sheets-Sheet 1
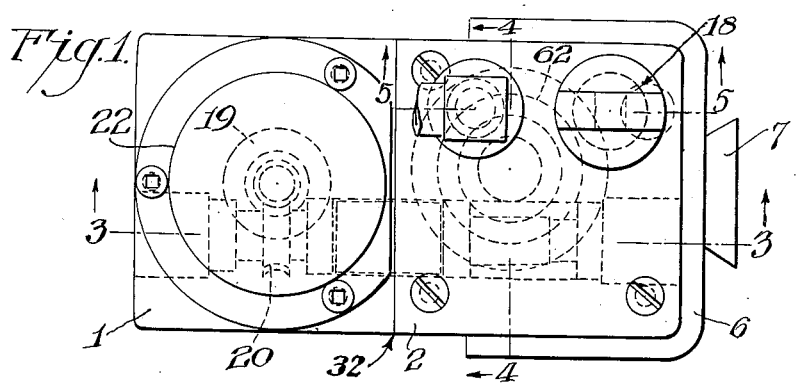
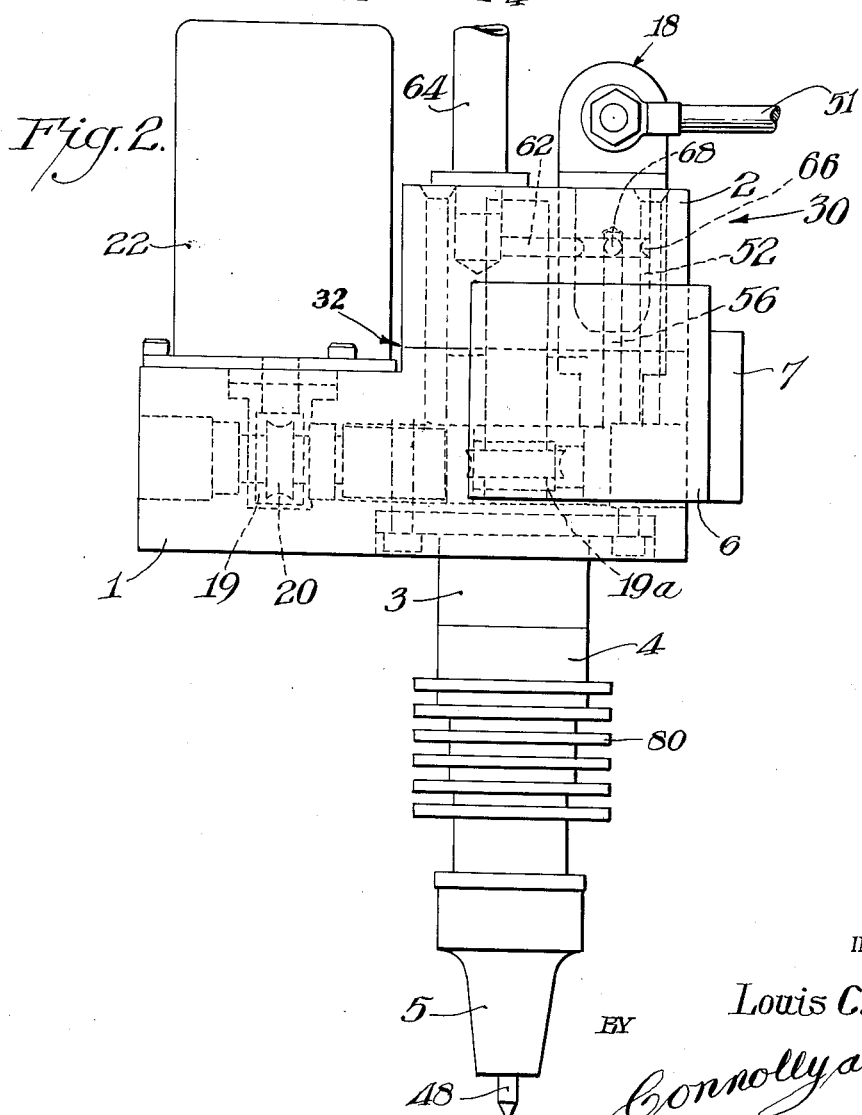
INVENTOR
Louis C. McNutt
BY
Connolly and Hutz
ATTORNEYS May 8, 1962
L. C. McNUTT
3,033,976
WELDING TORCH
Filed May 11, 1960
3 Sheets-Sheet 2
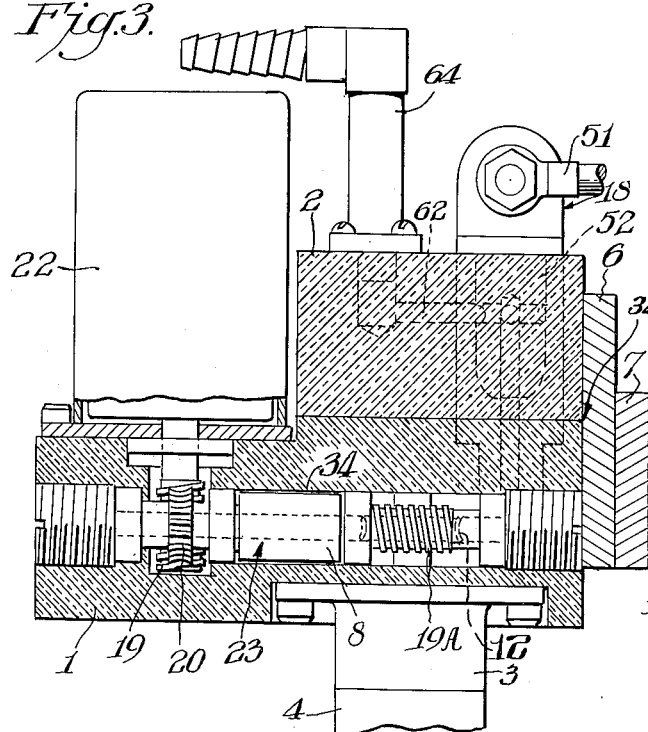
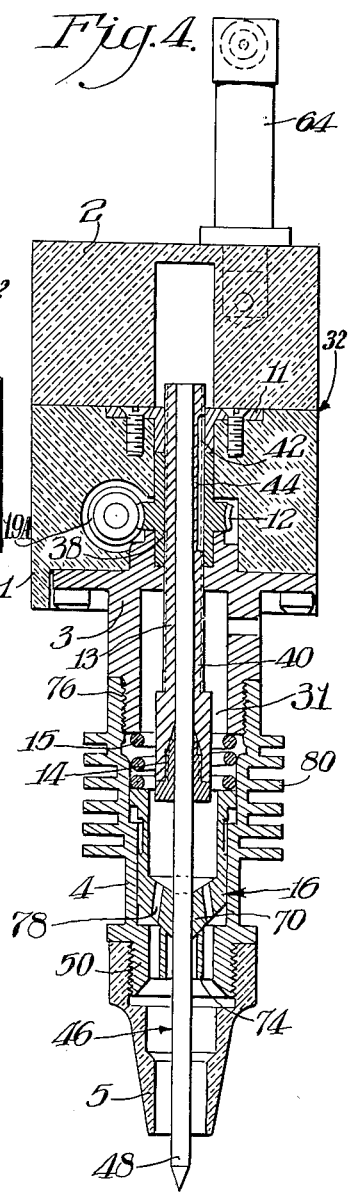
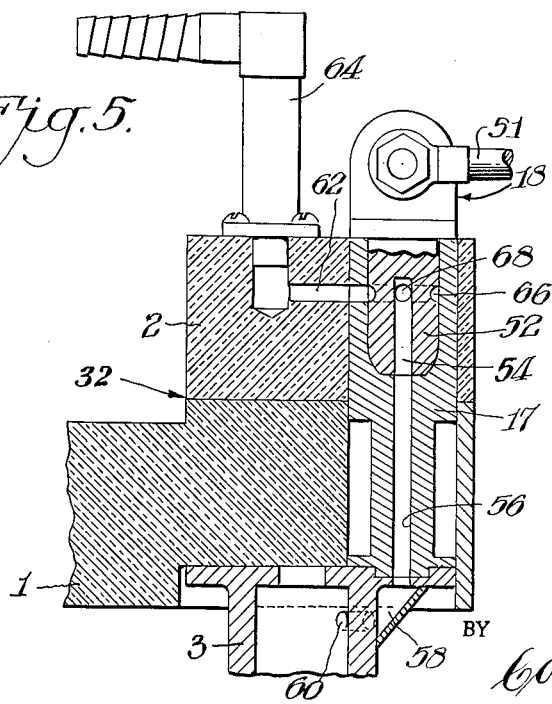
INVENTOR
Louis C. McNutt
BY Connolly and Hutz
ATTORNEYS May 8, 1962
L. C. McNUTT
3,033,976
WELDING TORCH
Filed May 11, 1960
3 Sheets-Sheet 3
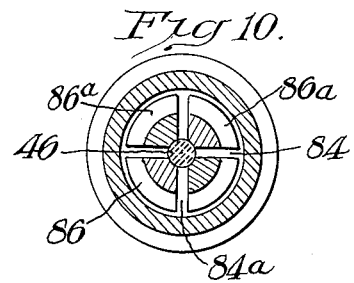
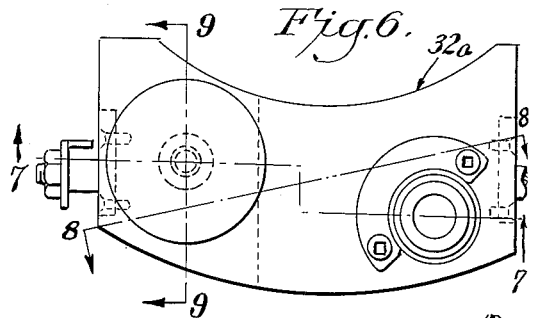
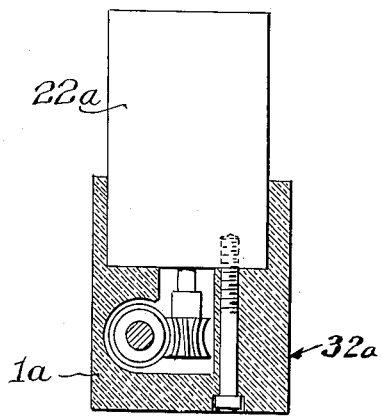
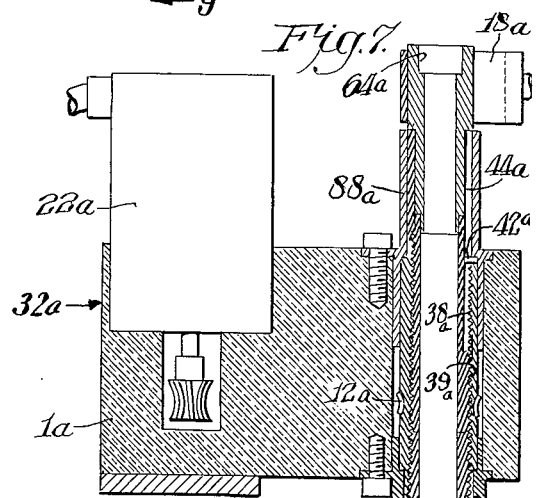
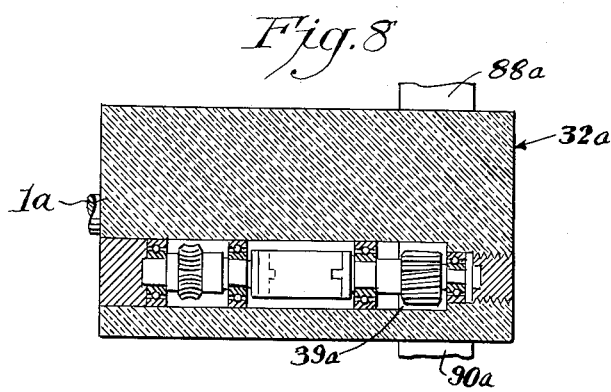
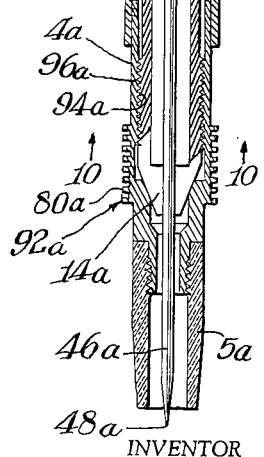
INVENTOR
Louis C. McNutt
BY Connolly and Hutz
ATTORNEYS

United States Patent Office 3,033,976
Patented May 8, 1962

3,033,976
WELDING TORCH
Louis C. McNutt, 1604 Rodney Drive, R.R. 6,
West Chester, Pa.
Filed May 11, 1960, Ser. No. 28,296
8 Claims. (Cl. 219—130)

This invention relates to an arc welding torch incorporating a nonconsumable electrode, and it more particularly relates to such a torch in which the arc length is automatically controlled.

Present practices and demands in the field of arc welding have made it most important to automatically control the length of the welding arc. However, most efforts to accomplish this have led to undue complications and expense as well as causing severe cooling problems. Furthermore, certain types of service, such as remote welding in areas exposed to radiation, do not permit the use of contaminating fluids as coolants which further accentuates the cooling problem.

An object of this invention is, therefore, to provide an inert gas-shielded arc welding torch having an automatic distancing control for a nonconsumable electrode which is dependable, relatively cool in operation, and simple and economical in structure.

In accordance with this invention, an elongated hollow electrode-holding body extends from one side of a housing made of insulating material. A portion of this body which grips the electrode is connected to a drive means mounted upon the other side of the housing by a transmission incorporating an insulated link for actuating a longitudinal movement of the electrode. Electrical and inert gas conduits are connected to a portion of the body extending from the side of the body away from the electrode for shielding them from the welding heat together with the drive means. The body is hollow and has an end spaced from the electrode to permit the inert gas flowing within the body to envelop the tip of the electrode. Furthermore, the body is made of a material which is heat as well as electrically conductive to facilitate the dissipation of the welding heat from its outer surface. In one form of this invention the electrode is directly gripped by the body which is movably mounted, and in another form the electrode is gripped by a stem portion of the body which is movably mounted within a stationary portion of the body.

Novel features and advantages of the present invention will become apparent to one skilled in the art from a reading of the following description in conjunction with the accompanying drawings wherein similar reference characters refer to similar parts and in which:

FIG. 1 is a plan view of one embodiment of this invention;

FIG. 2 is a front view in elevation of the embodiment shown in FIG. 1;

FIGS. 3, 4 and 5 are cross-sectional views taken through FIG. 1 respectively along the lines 3—3, 4—4 and 5—5.

FIG. 6 is a plan view of another embodiment of this invention.

FIG. 7 is a cross-sectional view in elevation taken through FIG. 6 along the line 7—7.

FIG. 8 is a cross-sectional view taken through FIG. 6 along the line 8—8.

FIG. 9 is a cross-sectional view taken through FIG. 6 along the line 9—9; and

FIG. 10 is a cross-sectional view taken through FIG. 7 along the line 10—10.

In FIGS. 1 and 2 is shown an arc welding torch 30 which includes a hollow cylindrical body 4 made of a material, for example, brass which is both electrically and heat conductive. This hollow cylindrical body is mounted upon a housing 32 made of an insulating material such as glass which is, for convenience, made of two machined blocks of glass 1 and 2. Referring to FIGS. 3 and 4 in conjunction with FIGS. 1 and 2, an elongated electrode gripping stem 13 extends within the longitudinal cavity 31 of body 4 from housing 32. Stem 13 is connected to a drive means 22, which is a reversible means of producing motion such as an electric motor mounted upon housing 32 by a transmission means 34 for actuating a longitudinal movement of stem 13. Transmission 34 includes a shaft 23 which is perpendicularly disposed relative to shaft 36 of motor 22 and stem 13. Shaft 23 connects the drive from motor shaft 36 to stem 13 by engagement of motor shaft worm gear 19 with shaft pinion gear 20 and the engagement of shaft worm gear 19a with pinion gear 12 engaged with stem 13. Transmission shaft coupling 8 is made of a suitable material to insulate one end of shaft 23 from the other to prevent conduction of the welding current to motor 22.

Pinion 12 is engaged with stem 13 by internal threads 38 which engage external threads 40 of stem 13 to form a nut type of engagement between pinion 12 and stem 13. Key 42 is secured to flanged retainer 11 fastened to housing block 1, and it extends into a longitudinal keyway 44 in stem 13 to prevent it from rotating with pinion 12. Rotation of pinion 12, therefore, actuates stem 13 to move upward or downward in accordance with its direction of rotation.

A nonconsumable electrode 46, which is, for example, made of tungsten, is inserted through stem 13 and grasped by its lower end by means of a gripping collet 14 of a conventional screw type. The tip 48 of electrode 46 extends past the open end 50 of a body 4 and through a cup 5, which is for example made of a ceramic composition in a shape designed for conducting a shield of inert gas about the work area surrounding tip 48.

An electrical conductor 51 is connected as shown in FIG. 5 to body 4 through terminal plug 18 and tubular connector 17 to hollow cylindrical body 4. The lower portion 52 of terminal plug 18 includes a longitudinal cavity 54 aligned with a similar longitudinal cavity 56 in tubular connector 17 for conducting a flow of inert gas into the interior of hollow body 4 through diagonal passageway 58 and hole 60 in the wall of body 4. This flow of inert gas is introduced into cavity 54 in plug 18 through a channel 62 in glass block 2 to which is connected a supply tube 64. The lower portion 52 of plug 18 also includes an annular groove 66 for conducting inert gas into cavity 54 through a series of radially disposed holes 68. The disposition of the electrical and gas conduits on the side of block 2 away from the electrode together with the drive means shields them from its heat.

The source of power is connected from body 4 to tungsten electrode 46 adjacent its lower portion by a unique resilient collet 16 which has a wedge-shaped nose 70 which is split to form a series of fingers 72 (not individually shown) which engage the sides of electrode 46. The nose 70 of collet 16 is resiliently forced into contact with ring 74 which is mounted within open end 50 of body 4 in a manner which permits inert gases to readily flow around and about it. This resilient force is provided by a coil spring 15 which reacts between a shoulder 76 formed upon the portion of upper body 3 which is screwed into body 4. The resilient reaction of spring 15 forces nose 70 into ring 74 which firmly compresses electrode 46 within fingers 72 of collet 16 to provide a dependable electrical connection from body 4 to electrode 46 without interfering with the upward and downward movement of electrode 46 as it is actuated by a movement of stem 13. A number of longitudinal ports 78 extend through nose 70 of collet 16 to conduct inert gases from the interior of body 4 into gas cup 5 to form a shield about tip 48. This form of mounting greatly minimizes the length of body 4 which is advantageous for work in confined areas.

A series of fins 80 are formed upon the outer surface of body 4 to help conduct heat away from it which in conjunction with its open internal and exposed outer structure avoids any necessity to provide any special means for cooling the torch. A means for mounting torch 30 upon a supporting structure is provided by a dove-tailed block 7 mounted upon a bracket 6. This facilitates its engagement and disengagement from a welding fixture.

In FIGS. 6–10 is shown another embodiment of this invention in which the hollow cylindrical body 4a itself engages tungsten electrode 46a by means of a collet 14a formed upon its lower end. Collet 14a as shown in FIG. 10 is cut by four slots 84a to provide four gripping fingers 86a which firmly engage non-consumable tungsten electrode 46a. In this description of FIGS. 6–10 only those parts specifically different from those shown in FIGS. 1–5 will be discussed and all parts not discussed are substantially similar to those previously described in detail.

Movement of electrode 46a toward and away from the work area is accomplished by longitudinal movement of hollow body 4a obtained through rotation of pinion 12a. This rotational movement is connected to longitudinal internal threads 38a within collar 39a upon which pinion 12a is formed which engage external threads 40a upon the outer surface of hollow body 4a. Rotation of body 4a is prevented by pin or key 42a which engages slot or keyway 44a in the wall of body 4a. Drive motor 22a is mounted on a side of glass block 1a remote from electrode 46a, and terminal 18a for connecting electrical leads and connection 64a for inert gas are also mounted upon the end of the hollow body 4a extending from this shielded side of block 1a. This maintains these elements out of range of the welding heat thereby permitting extended operation of the torch without damaging them.

An upper bearing tube 88a and a lower bearing tube 90a extend from block 1a about the outer surface of body 4a to guide its upward and downward movement and an outer body 92a also made of a heat and electricity conducting material such as brass is mounted upon the lower portion of body 4a by internal and external screw threads 94a and 96a to provide a means for compressing collet fingers 86a together to grip electrode 46a and to provide a means for connecting a ceramic gas shielding cup 5a in a spaced position about the tip 48a of electrode 46a. Fins 80a for conducting welding heat away from body 4a are formed upon the lower surface of outer body 92a.

The functional characteristics of the embodiment in FIGS. 6–10 are in general quite similar to those of FIGS. 1–5 however, the structure of FIGS. 1–5 can be made much shorter than that of FIGS. 6–10 because of the use of a stationary body 4 and a movable stem 14 together with resilient collet 16 which grips electrode 46 but permits it to slide up and down within it. However in basic functional respects both of the illustrated torches enjoy remarkably cool operating characteristics which permits them to operate for extended periods of time without any special cooling such as liquid cooling. This allows them to be utilized within areas where liquids are not permitted. The transmission of the welding current through the body does not unduly heat it because of its hollow and heat conductive structure as well as supply of inert gas that is continuously supplied through its interior.

What is claimed is:

1. An inert gas arc welding torch incorporating a non-consumable electrode comprising an elongated hollow cylindrical body of electricity and heat conductive material extending from one side of a housing made of insulating material, said nonconsumable electrode extending from the end of said body remote from said housing, gripping means securing said electrode to a portion of said body, a drive means mounted upon another side of said housing which is remote from said electrode, transmission means extending through said housing and including an insulated link connecting said drive means with said portion of said body to which said electrode is secured for actuating a longitudinal movement of said electrode toward and away from the work area, extension means connected to said body and disposed upon said side of said housing remote from said electrode, and electrical and inert gas conduit means connected to said extension means for connecting a source of electrical energy and a supply of inert gas thereto for operating said torch and shielding its tip from the atmosphere.

2. A torch as set forth in claim 1 wherein a portion of said body remote from said housing includes a collet means for directly connecting the end of said body adjacent the tip of said electrode to said electrode, and said transmission means is connected to a portion of said body disposed within said housing.

3. A torch as set forth in claim 2 wherein said collet means includes a split collet element formed upon a portion of said body remote from said housing, and an external tubular body is screwed upon the outer surface of said split collet element for compressing it to grip said electrode.

4. A torch as set forth in claim 1 wherein said drive means is an electric motor, and said transmission means incorporates an external screw thread formed about an outer surface of a portion of said body and an internally threaded collar engaged with said portion of said body which is rotated to provide longitudinal movement of said portion of said body.

5. A torch as set forth in claim 4 wherein said transmission also includes a worm and pinion drive from the shaft from said motor to said collar, and said worm and pinion drive includes an insulated link for preventing the heat from said torch from being transmitted to said motor.

6. A torch as set forth in claim 1, wherein said body includes a stem mounted to move in a longitudinal direction within the outer portion of said body, said transmission means being connected to longitudinally move said stem, and a resilient collet reacting between said body and said electrode between said stem and the tip of said electrode to provide an electrical connection between said body and said electrode without unduly restricting the longitudinal movement of said electrode and stem within said body.

7. A torch as set forth in claim 6 wherein said resilient collet is a cup-shaped element having split fingers upon a tapered end gripping a portion of said electrode disposed adjacent its tip, said tapered end being disposed within a ring formed in a portion of said body disposed adjacent said electrode tip, a spring reacting between a portion of said body disposed opposite said ring which forces said fingers together within said ring and resiliently compresses them about said electrode.

8. A torch as set forth in claim 6 wherein said extension means is a channeled electrical conductor for connecting electrical power to said body and conducting inert gas into it.

References Cited in the file of this patent
UNITED STATES PATENTS

| | | |
|---|---|---|
| 1,707,433 | Hand | Apr. 2, 1929 |
| 1,946,305 | Catlett | Feb. 6, 1934 |
| 2,106,692 | Embleton | Jan. 25, 1938 |
| 2,468,806 | Pilia | May 3, 1949 |